United States Patent
Vengerov

(10) Patent No.: US 7,665,089 B1
(45) Date of Patent: Feb. 16, 2010

(54) FACILITATING DISTRIBUTED THREAD MIGRATION WITHIN AN ARRAY OF COMPUTING NODES

(75) Inventor: David Vengerov, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1156 days.

(21) Appl. No.: 10/980,422

(22) Filed: Nov. 2, 2004

(51) Int. Cl.
*G06F 9/46* (2006.01)

(52) U.S. Cl. ...................................... 718/102; 711/151

(58) Field of Classification Search ................. 718/102; 711/151
See application file for complete search history.

(56) References Cited

U.S. PATENT DOCUMENTS

| | | | | |
|---|---|---|---|---|
| 6,560,629 | B1 * | 5/2003 | Harris | 718/105 |
| 6,769,017 | B1 * | 7/2004 | Bhat et al. | 709/214 |
| 7,143,412 | B2 * | 11/2006 | Koenen | 718/102 |
| 7,318,128 | B1 * | 1/2008 | Dice | 711/151 |

OTHER PUBLICATIONS

Kelly A. Shaw & Daily J. William, "Migration in Single Chip Multiprocessors", 2002, IEEE Computer Architecture Letters, vol. 1, p. 1-4.*
Jenks et al, A Multithreaded Runtime System with Thread Migration for Distributed Memory Parallel Computing, University of California, Irvine, 2003, pp. 1-9.*
Liang et al., Selecting threads for workload migration in software distributed shared memory systems, Elsevier Science B.V., 2002, pp. 893-913.*

* cited by examiner

*Primary Examiner*—Diem K Cao
(74) *Attorney, Agent, or Firm*—Park, Vaughan & Fleming LLP

(57) ABSTRACT

One embodiment of the present invention provides a system that performs thread migration within an array of computing nodes, wherein computing nodes in the array contain central processing units (CPUs) and/or memories. During operation, the system identifies CPUs within the array of computing nodes that are available to accept a given thread. For each available CPU, the system computes an average communication distance between the CPU and memories which are accessed by the given thread. Next, the system determines whether to move the given thread to an available CPU based on the average communication distance for the available CPU.

27 Claims, 2 Drawing Sheets

FACILITATING DISTRIBUTED THREAD MIGRATION WITHIN AN ARRAY OF COMPUTING NODES

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to the scheduling of threads within a multiprocessor system.

2. Related Art

Multiprocessor systems typically contain a number of central processing units (CPUs) and memories, which are coupled together through a communication network. For example, in an exemplary system, nodes containing CPUs and memories are organized into a two-dimensional grid, wherein each node can communicate with neighboring nodes (in north, east, south or west directions). Furthermore, each CPU can execute one or more threads in parallel.

While executing on a CPU, a thread can access memory locations within other nodes in the grid. The latency of these memory accesses depends largely on the communication distance (number of hops) between the CPU executing the thread and the memory location being accessed. Hence, it is generally desirable to minimize the distance between the CPU, which is executing the thread, and the memory locations that the thread is accessing. However, it is not easy to minimize this distance because the memory locations with which the thread communicates can change frequently during the thread's lifetime. Furthermore, new threads can be added to the system over time, and existing threads can be removed when they complete their tasks.

Moreover, simply minimizing communication distance may not lead to optimal performance because when a thread communicates with a specific memory location, it can create contention for communication bandwidth with other threads if their communication paths cross. Such memory contentions slow down accesses for all threads involved.

SUMMARY

One embodiment of the present invention provides a system that performs thread migration within a graph containing computing nodes, wherein computing nodes in the graph contain central processing units (CPUs) and/or memories. During operation, the system identifies CPUs within the graph of computing nodes that are available to accept a given thread. For each available CPU, the system computes an average communication distance between the CPU and memories which are accessed by the given thread. Next, the system determines whether to move the given thread to an available CPU based on the average communication distance for the available CPU.

In a variation on this embodiment, the system estimates, for each available CPU, the communication contention that would result from migrating the given thread to the available CPU. The system subsequently uses this estimated communication contention while determining whether to move the given thread to an available CPU.

In a further variation, while estimating the communication contention for a given CPU, the system computes a communication vector for the given CPU, wherein the communication vector is a sum of vectors from the given CPU to the memories accessed by the given thread. The system also identifies threads associated with neighboring CPUs that have average communication distances which are less than the communication distance for the given CPU, and which have communication vectors with a similar absolute angle to the communication vector for the given CPU. Next, the system obtains performance measurements of contention-related slowdowns for the identified threads, and averages the contention-related slowdowns to produce an estimated contention-related slowdown for the given CPU.

In a further variation, the system determines whether to move the given thread to a given CPU by using a weighting scheme to make a tradeoff between the average communication distance and the estimated communication contention for the given CPU.

In a further variation, the system uses a reinforcement-learning technique to make the tradeoff between the average communication distance and the estimated communication contention for the given CPU.

In a variation on this embodiment, while determining whether to move the given thread to an available CPU, the system considers the costs of the moving process.

In a variation on this embodiment, when more threads want to move to a given CPU than the given CPU can support, only threads with the highest positive benefit from moving to the given CPU are allowed to move.

In a variation on this embodiment, the thread migration is performed in a distributed manner, wherein each CPU performs the method for threads which are currently executing on the CPU.

In a variation on this embodiment, each CPU can accommodate multiple threads, and an "available CPU" is defined as a CPU which has an available CPU slot to accept a thread.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Multiprocessor System

Figure 1:
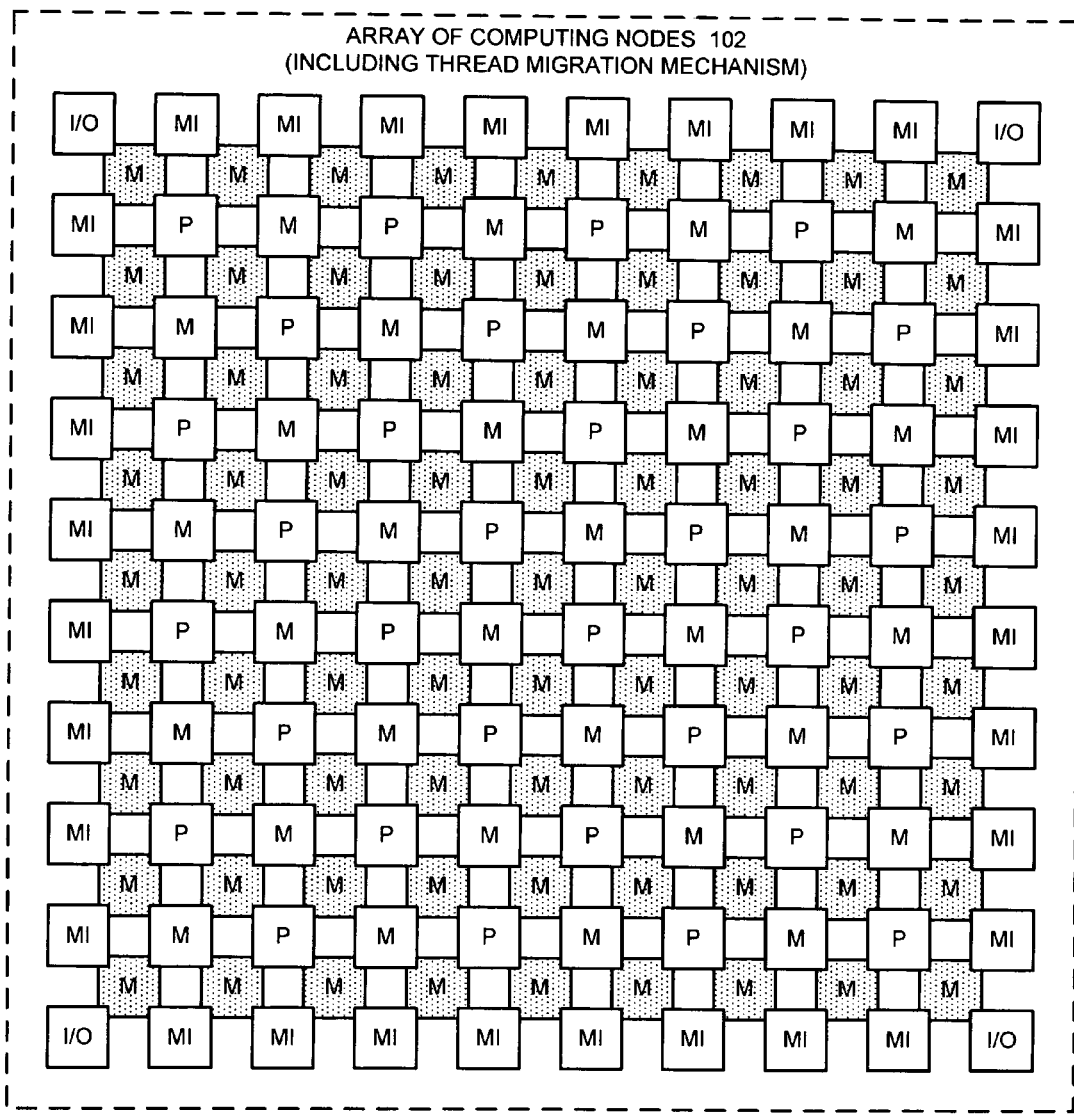
FIG. 1 illustrates a multiprocessor system which is organized as a grid in accordance with an embodiment of the present invention.

FIG. 1 illustrates a multiprocessor system which includes an array of computing nodes 102 in accordance with an embodiment of the present invention. Each node in the array can contain a processor and/or a memory.

For example, in the embodiment of the present invention illustrated in FIG. 1, the array of computing nodes 102 is comprised of a 19-by-19 grid of nodes, with 9 even-numbered rows containing only memory chips (9 in each row) and the 10 odd-numbered rows, which contain memory chips, CPUs or interface chips. Note that chips on the edge of the grid labeled MI support interface functions, while chips on the corners of the grid labeled I/O support I/O functions. In the embodiment of the present invention illustrated in FIG. 1, the array contains 32 CPUs and 113 memory chips. Moreover, each CPU provides hardware support for 8 execution strands.

For purposes of the present invention, the actual layout of the multiprocessor system is not important; it does not have to be a regular grid. In general, any kind of a graph will work, as long as distances between CPUs and memory chips, e.g. in terms of the number of hops, can be defined.

On each CPU, the mechanism that maps from virtual-to-physical addresses is simple enough that each thread knows what physical memory chip it accesses if there are no failures in the system. (During a memory failure, this mapping can change.)

The communication path between a thread and a memory chip it accesses can be represented by a vector ending at the location of the memory chip. If a thread's communication vector is intersected by another vector (representing the communication path of another non-idle thread), and if both vectors point in the same general direction (NE., NW., SE., SW.), then a contention takes place. Each contention reduces the amount of data that can be read from a memory chip.

In the present invention, array of computing nodes 102 is associated with a thread migration mechanism, which migrates threads to CPUs in a manner that minimizes communication distance as well a communication contention between threads. This thread migration mechanism can reside within a special service processor supervising the system. Or, alternatively, the thread migration mechanism can be distributed across the CPUs, so that each CPU performs its own thread-migration computations to determine whether to migrate any of its threads to other CPUs.

Thread Migration Process

During the thread migration process, every thread in the system considers all available CPUs and computes the potential benefit from moving to each available CPU in terms of reducing the thread's expected completion time. This computation involves considering communication distance and possibly communication contention.

Figure 2:
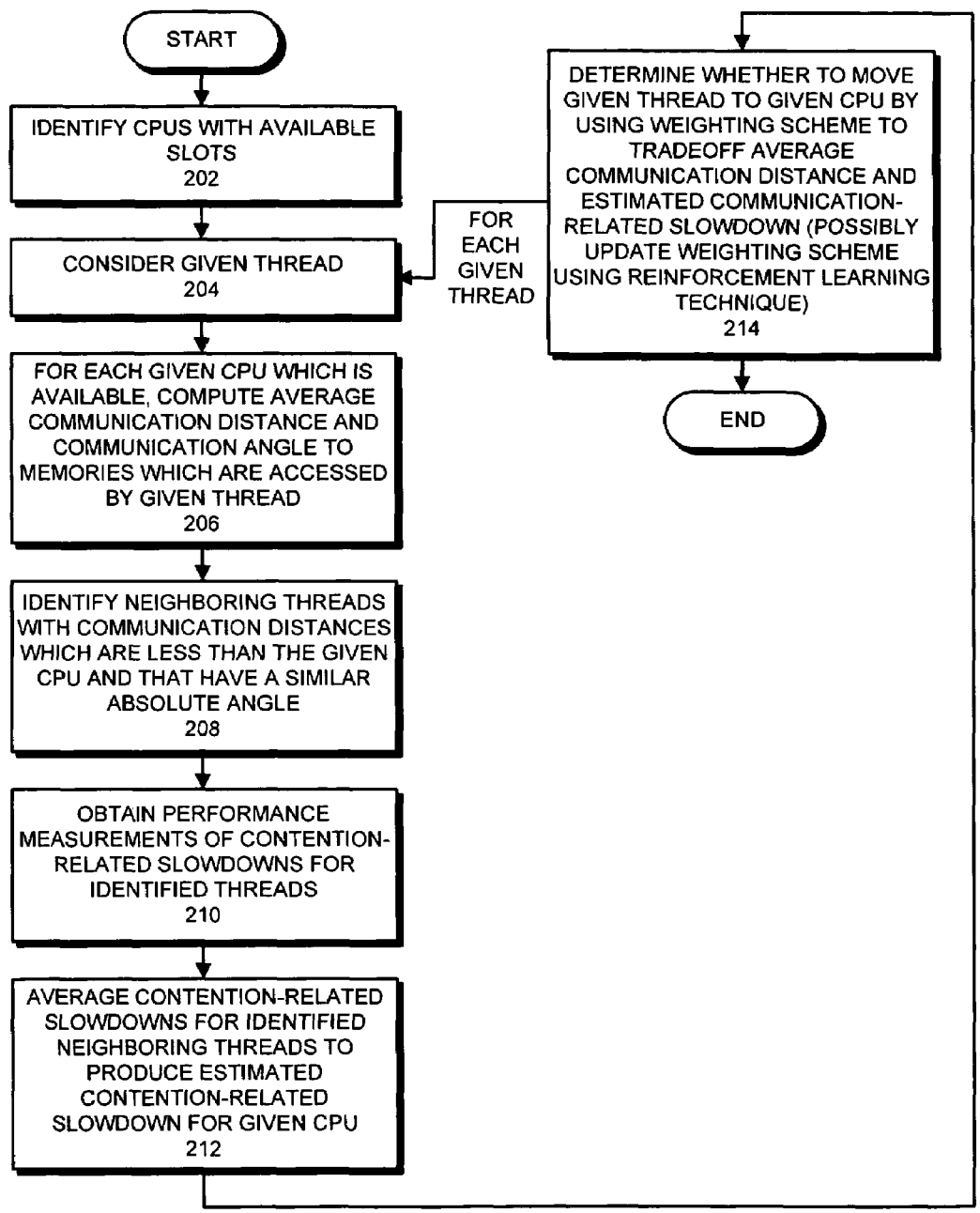
FIG. 2 presents a flow chart illustrating the thread-migration process in accordance with an embodiment of the present invention.

More specifically, FIG. 2 presents a flow chart illustrating the thread-migration process in accordance with an embodiment of the present invention. The system first identifies CPUs with available slots to accommodate an additional thread (step 202). CPUs without available slots are not considered further.

Next, the system considers a given thread in the system (step 204). For this given thread, and for each given CPU (which is available), the system computes the average communication distance and communication angle to memories which are accessed by the given thread (step 206). This can involve computing the "vector sum" of the communication paths for the given thread on the given CPU.

Next, for the given CPU, the system considers all threads on nearly CPUs and all threads that are accessing memory chips on nearby CPUs. The system then selects those threads which have a communication vector, which is less than or equal to in length to the given thread's supposed communication vector at the new location, and that have a similar (absolute) communication angle (step 208). Note that the system does not consider neighboring threads with longer communication distances, because these longer communication distances may cause communication pathways from a neighboring thread to encounter congestion in distant regions of the array, which are not relevant for the shorter communication distances from the given CPU.

In an alternative embodiment of the present invention, the vector sum of communication vectors of the selected threads is computed and used as the average communication vector for the neighborhood around the new location. In this embodiment, locations where the average communication vector (as computed above) is more colinear with the given thread's new communication vector are preferred while determining where to move the given thread.

Alternatively, possible locations for migration can be ranked in terms of the length of the given thread's own communication vector after migration. The first migration strategy is generally preferable when threads access each memory location for a long time, while the second migration strategy is generally preferable when threads switch often between memory locations they access. (Ideally, a reinforcement learning algorithm can be used for weighing these two measures—length of the given thread's own communication vector after supposed migration versus co-linearity with the neighborhood communication vector—in the context of the given thread's memory access pattern.)

In one embodiment of the present invention, the system also obtains measurements of contention-related slowdowns from the identified neighboring threads (step 210) and averages them to produce an estimated contention-related slowdown for the given CPU (step 212). Note that the system assumes that neighboring threads with similar communication patterns will exhibit similar contention-related slowdowns to the given thread on the given CPU. Next, the system determines whether to move the given thread to the given CPU by using a (possibly dynamic) weighting scheme to trade off the average communication distance and the estimated contention-related slowdown (step 214). Note that when more threads want to move to a CPU than it can support, the system allows the threads with the highest positive benefit make the move. If any threads have not been considered, the system returns to step 204 to consider another thread.

Also note any type of weighting scheme that trades off average communication distance and contention-related slowdown can be used. For example, in one embodiment of the present invention, the system uses a dynamic weighting scheme, which employs a reinforcement-learning technique to update weight values. (For a description of reinforcement learning techniques, please refer to R. S. Sutton and A. G. Barto, *Reinforcement Learning: An Introduction*. MIT Press, 1998.) In one embodiment of the present invention, this reinforcement learning technique learns the benefit of migration based on the two variables: individual decrease in the expected "no-contention" completion time and an increase in the communication alignment with new neighbors.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing thread migration within a graph containing computing nodes, wherein computing nodes in the graph contain central processing units (CPUs) and/or memories, the method comprising:
   identifying CPUs within the graph of computing nodes that are available to accept a given thread;
   for each available CPU:
      determining a communication vector for the given thread by determining an average communication distance and an average communication angle between the available CPU and memories which are accessed by the given thread; and
      identifying a set of threads from all threads associated with neighboring CPUs, wherein a length of a communication vector for each thread is less than or equal to a length of the communication vector for the given thread, and wherein an absolute angle of a communication vector for each thread is a similar to an absolute angle of the communication vector for the given thread; and
   determining whether to move the given thread to an available CPU based on a colinearity between the communication vector for the given thread for an available CPU and an average communication vector for a set of identified threads for an available CPU.

2. The method of claim 1, wherein the method further comprises:
   estimating, for each available CPU, a communication contention that would result from migrating the given thread to the available CPU;
   wherein determining whether to move the given thread to an available CPU additionally involves considering the estimated communication contention.

3. The method of claim 2, wherein estimating the communication contention for a given CPU involves:
   obtaining performance measurements of contention-related slowdowns for the identified threads; and
   averaging the contention-related slowdowns to produce an estimated contention-related slowdown for the given CPU.

4. The method of claim 2, wherein determining whether to move the given thread to a given CPU involves using a weighting scheme to make a tradeoff between the average communication distance and the estimated communication contention for the given CPU.

5. The method of claim 4, further comprising using a reinforcement-learning technique to make the tradeoff between the average communication distance and the estimated communication contention for the given CPU.

6. The method of claim 1, wherein determining whether to move the given thread to an available CPU involves considering the costs involved in the moving process.

7. The method of claim 1, wherein when more threads want to move to a given CPU than the given CPU can support, only threads with the highest positive benefit from moving to the given CPU are allowed to move.

8. The method of claim 1, wherein the method is performed in a distributed manner, wherein each CPU performs the method for threads which are currently executing on the CPU.

9. The method of claim 1,
   wherein each CPU can accommodate multiple threads; and
   wherein an "available CPU" is defined as a CPU which has an available CPU slot to accept a thread.

10. A computer-readable storage medium storing instructions that when executed by a computer cause the computer to perform a method for performing thread migration within a graph containing computing nodes, wherein computing nodes in the graph contain central processing units (CPUs) and/or memories, the method comprising:
    identifying CPUs within the graph of computing nodes that are available to accept a given thread;
    for each available CPU:
       determining a communication vector for the given thread by determining an average communication distance and an average communication angle between the available CPU and memories which are accessed by the given thread; and
       identifying a set of threads from all threads associated with neighboring CPUs, wherein a length of a communication vector for each thread is less than or equal to a length of the communication vector for the given thread, and wherein an absolute angle of a communication vector for each thread is a similar to an absolute angle of the communication vector for the given thread; and
    determining whether to move the given thread to an available CPU based on a colinearity between the communication vector for the given thread for an available CPU and an average communication vector for a set of identified threads for an available CPU.

11. The computer-readable storage medium of claim 10, wherein the method further comprises:
    estimating, for each available CPU, a communication contention that would result from migrating the given thread to the available CPU;
    wherein determining whether to move the given thread to an available CPU additionally involves considering the estimated communication contention.

12. The computer-readable storage medium of claim 11, wherein estimating the communication contention for a given CPU involves:
    obtaining performance measurements of contention-related slowdowns for the identified threads; and
    averaging the contention-related slowdowns to produce an estimated contention-related slowdown for the given CPU.

13. The computer-readable storage medium of claim 11, wherein determining whether to move the given thread to a given CPU involves using a weighting scheme to make a tradeoff between the average communication distance and the estimated communication contention for the given CPU.

14. The computer-readable storage medium of claim 13, wherein the method further comprises using a reinforcement-learning technique to make the tradeoff between the average communication distance and the estimated communication contention for the given CPU.

15. The computer-readable storage medium of claim 10, wherein determining whether to move the given thread to an available CPU involves considering the costs involved in the moving process.

16. The computer-readable storage medium of claim 10, wherein when more threads want to move to a given CPU than the given CPU can support, only threads with the highest positive benefit from moving to the given CPU are allowed to move.

17. The computer-readable storage medium of claim 10, wherein the method is performed in a distributed manner, wherein each CPU performs the method for threads which are currently executing on the CPU.

18. The computer-readable storage medium of claim 10, wherein each CPU can accommodate multiple threads; and wherein an "available CPU" is defined as a CPU which has an available CPU slot to accept a thread.

19. An apparatus including a processor that performs thread migration within a graph containing computing nodes, wherein computing nodes in the graph contain central processing units (CPUs) and/or memories, the apparatus comprising:
- an identification mechanism configured to identify CPUs within the graph of computing nodes that are available to accept a given thread;
- a distance-computing mechanism, wherein for each available CPU the distance-computing mechanism is configured to:
  - determine a communication vector for the given thread by determining an average communication distance and an average communication angle between the available CPU and memories which are accessed by the given thread; and
  - identify a set of threads from all threads associated with neighboring CPUs, wherein a length of a communication vector for each thread is less than or equal to a length of the communication vector for the given thread, and wherein an absolute angle of a communication vector for each thread is a similar to an absolute angle of the communication vector for the given thread; and
- a determination mechanism configured to determine whether to move the given thread to an available CPU based on the colinearity between a communication vector for the given thread for an available CPU and an average communication vector for a set of identified threads for an available CPU.

20. The apparatus of claim 19, wherein the apparatus further comprises:
- a contention-estimating mechanism configured to estimate, for each available CPU, a communication contention that would result from migrating the given thread to the available CPU; and
- wherein the determination mechanism is additionally configured to consider the estimated communication contention in determining whether to move the given thread to an available CPU.

21. The apparatus of claim 20, wherein the contention-estimating mechanism is configured to:
- obtain performance measurements of contention-related slowdowns for the identified threads; and to
- average the contention-related slowdowns to produce an estimated contention-related slowdown for the given CPU.

22. The apparatus of claim 20, wherein the determination mechanism is configured to use a weighting scheme to make a tradeoff between the average communication distance and the estimated communication contention for the given CPU.

23. The apparatus of claim 22, wherein the determination mechanism is configured to use a reinforcement-learning technique to make the tradeoff between the average communication distance and the estimated communication contention for the given CPU.

24. The apparatus of claim 19, wherein while determining whether to move the given thread to an available CPU, the determination mechanism is configured to consider the costs involved in the moving process.

25. The apparatus of claim 19, wherein when more threads want to move to a given CPU than the given CPU can support, only threads with the highest positive benefit from moving to the given CPU are allowed to move.

26. The apparatus of claim 19,
- wherein the apparatus is distributed so that a given CPU includes its own copy of the identification mechanism, the distance-computing mechanism, and the determination mechanism; and
- wherein the given CPU performs the method for threads which are currently executing on the given CPU.

27. The apparatus of claim 19,
wherein each CPU can accommodate multiple threads; and wherein an "available CPU" is defined as a CPU which has an available CPU slot to accept a thread.

* * * * *

UNITED STATES PATENT AND TRADEMARK OFFICE
CERTIFICATE OF CORRECTION

PATENT NO. : 7,665,089 B1  Page 1 of 1
APPLICATION NO. : 10/980422
DATED : February 16, 2010
INVENTOR(S) : David Vengerov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1506 days.

Signed and Sealed this

Seventh Day of December, 2010

David J. Kappos
*Director of the United States Patent and Trademark Office*